United States Patent
Yi et al.

(10) Patent No.: US 7,720,593 B2
(45) Date of Patent: May 18, 2010

(54) FUEL INJECTION STRATEGY FOR GASOLINE DIRECT INJECTION ENGINE DURING HIGH SPEED/LOAD OPERATION

(75) Inventors: Jianwen James Yi, Canton, MI (US); Steven Todd Wooldridge, Saline, MI (US); George Carver Davis, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 11/865,748

(22) Filed: Oct. 2, 2007

(65) Prior Publication Data

US 2009/0088945 A1     Apr. 2, 2009

(51) Int. Cl.
G06F 19/00 (2006.01)
F02M 51/00 (2006.01)

(52) U.S. Cl. ............... 701/105; 701/104; 123/299; 123/480

(58) Field of Classification Search ......... 701/101–105, 701/110–115; 123/295, 299, 300, 304, 305, 123/431, 478, 480, 492; 60/284, 285
See application file for complete search history.

(56) References Cited

U.S. PATENT DOCUMENTS

| | | | |
|---|---|---|---|
| 5,794,585 A * | 8/1998 | Yonezawa et al. | 123/299 |
| 5,794,586 A | 8/1998 | Oda et al. | |
| 5,893,352 A | 4/1999 | Fujiwara | |
| 6,138,638 A | 10/2000 | Morikawa | |
| 6,378,488 B1 | 4/2002 | Trigui et al. | |
| 6,425,367 B1 * | 7/2002 | Hiraya et al. | 123/299 |
| 6,516,608 B1 * | 2/2003 | Poggio et al. | 60/284 |
| 6,712,037 B2 | 3/2004 | Xu | |
| 6,782,857 B1 | 8/2004 | Goshorn | |
| 6,782,867 B2 | 8/2004 | Nakayama et al. | |
| 7,089,908 B2 | 8/2006 | Fujieda et al. | |
| 7,234,440 B2 | 6/2007 | Hilditch | |
| 2009/0150052 A1 * | 6/2009 | Kumano et al. | 701/103 |

FOREIGN PATENT DOCUMENTS

JP          10061466 A  *  3/1998  ............ 123/299

OTHER PUBLICATIONS

Jianwen Yi, Z. Han, et al. "Modeling of the Interaction of Intake Flow and Fuel Spray in DISI Engines", SAE paper 2000-01-0656, Mar. 6-9, 2000.

* cited by examiner

Primary Examiner—Willis R Wolfe, Jr.
(74) Attorney, Agent, or Firm—Allan J. Lippa; Brooks Kushman P.C.

(57) ABSTRACT

A system and method for controlling operation of a multiple cylinder direct injection internal combustion engine include injecting fuel directly into the combustion chamber during the exhaust stroke at high engine speeds and loads to reduce the effect of intake airflow on the injection spray and improve fuel-air mixture homogeneity.

20 Claims, 5 Drawing Sheets

FUEL INJECTION STRATEGY FOR GASOLINE DIRECT INJECTION ENGINE DURING HIGH SPEED/LOAD OPERATION

BACKGROUND

1. Technical Field

The present disclosure relates to a system and method for fuel injection in a gasoline direct injection engine during high speed/load operation.

2. Background Art

Direct-injection spark-ignition (DISI) internal combustion engines have been developed to reduce fuel consumption and feedgas emissions of gasoline engines. DISI engines may operate in a stratified charge mode with layers or strata of richer air/fuel ratio near the spark plug and progressively leaner layers below under certain operating conditions, such as low to medium loads and engine speeds and during starting, for example. At higher engine loads and speeds, a stoichiometric or slightly rich homogeneous charge is provided where the air-fuel mixture of the charge is generally well-mixed and homogeneous throughout the combustion chamber.

DISI engines have traditionally used a low-pressure fuel pump in combination with an auxiliary or high-pressure fuel pump to produce injection pressures that provide desired torque while meeting combustion efficiency and emissions targets. More recently, as disclosed in U.S. Pat. No. 6,712,037 for example, gasoline direct injection engines have been developed that rely solely on a low-pressure fuel pump, which provides advantages in terms of lower cost and complexity, but may have reduced cold start performance and reduced maximum torque output at higher engine speeds/loads.

A fuel injection strategy to improve performance during engine startup is disclosed in U.S. Pat. No. 7,234,440, which uses two or more fuel injections for a single combustion event or cycle. During start-up some fuel may be injected during the exhaust stroke with the remaining fuel injected during the intake and/or compression strokes. That strategy includes transitioning to a single injection for normal operation after some number of combustion events have occurred. Similarly, U.S. Pat. No. 7,089,908 discloses modifying valve timing to increase residual exhaust gases and injecting some fuel during the exhaust stroke under partial loading conditions, but transitions to a reference mode with a single injection during the intake stroke at higher speeds/loads.

Under high speed, high load conditions, particularly in applications that rely solely on a low-pressure fuel pump with a side-mounted fuel injector, the injected fuel spray may be deformed by the incoming air stream, which prevents fuel from penetrating across the cylinder and mixing properly to form a homogeneous charge. One method to improve mixture homogeneity, as disclosed in U.S. Pat. No. 6,378,488, uses an intake air deflector in the cylinder head to reduce the influence of the intake air on the injected fuel spray. While this approach may be suitable for many applications, it affects operation across the entire operating range and requires increased complexity in the cylinder head to form the deflectors, which may also impact the cost of the system.

SUMMARY

A system and method for controlling operation of a multiple cylinder direct injection internal combustion engine include injecting a fraction of total fuel injected per engine cycle directly into the combustion chamber during the exhaust stroke at high engine speeds and loads to reduce the effect of intake airflow on the injection spray and improve fuel-air mixture homogeneity.

In one embodiment a direct injection multiple cylinder internal combustion engine includes a fuel injector associated with each cylinder and configured to inject fuel directly into the cylinder in response to control signals during operation of the engine. A controller in communication with each fuel injector and configured to generate control signals to control fuel injection generates a fuel injection signal for the injector to start and end a first fuel injection during an exhaust stroke when the engine is operating at high speed and high load. The first fuel injection mixes with inducted air and fuel from at least a second fuel injection that starts during the subsequent intake stroke and/or a compression stroke of the same cycle to form a mixture for combustion. An ignition source, such as a spark plug, ignites the mixture to initiate combustion. The system and method are particularly suited for use with low-pressure direct injection engines that have a single fuel pump to provide fuel at a pressure of less than about 40 bar for example.

The present disclosure includes embodiments having various advantages. For example, the systems and methods of the present disclosure provide increased torque at high engine speeds and loads using a single, low-pressure fuel pump. Embodiments of the present disclosure provide fuel-air mixing homogeneity at high engine speeds and loads resulting in reduced soot. Separation between a first fuel injection and subsequent fuel injection(s) according to the present disclosure increases mixing time and may reduce piston wetting to reduce smoke. Embodiments of the present disclosure facilitate elimination of an auxiliary high-pressure fuel pump reducing cost and complexity of the engine.

The above advantages and other advantages and features will be readily apparent from the following detailed description of the preferred embodiments when taken in connection with the accompanying drawings.

DETAILED DESCRIPTION OF THE DRAWINGS

Figure 8:
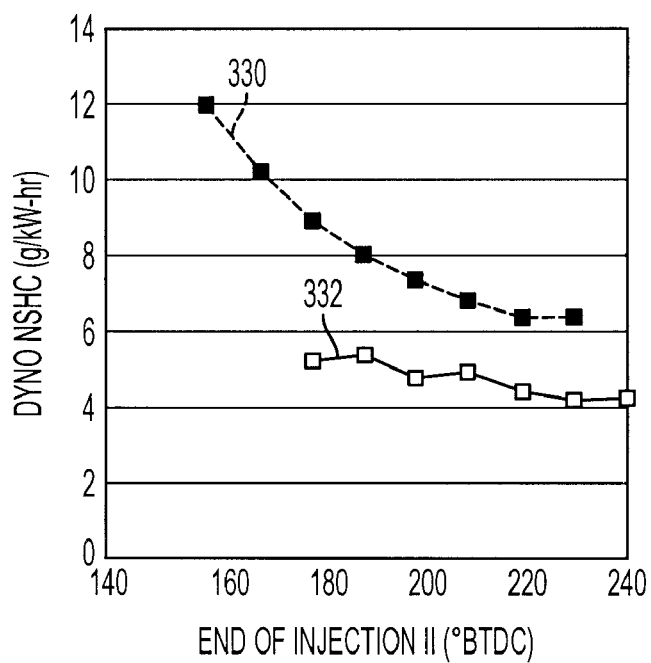
Figure 9:
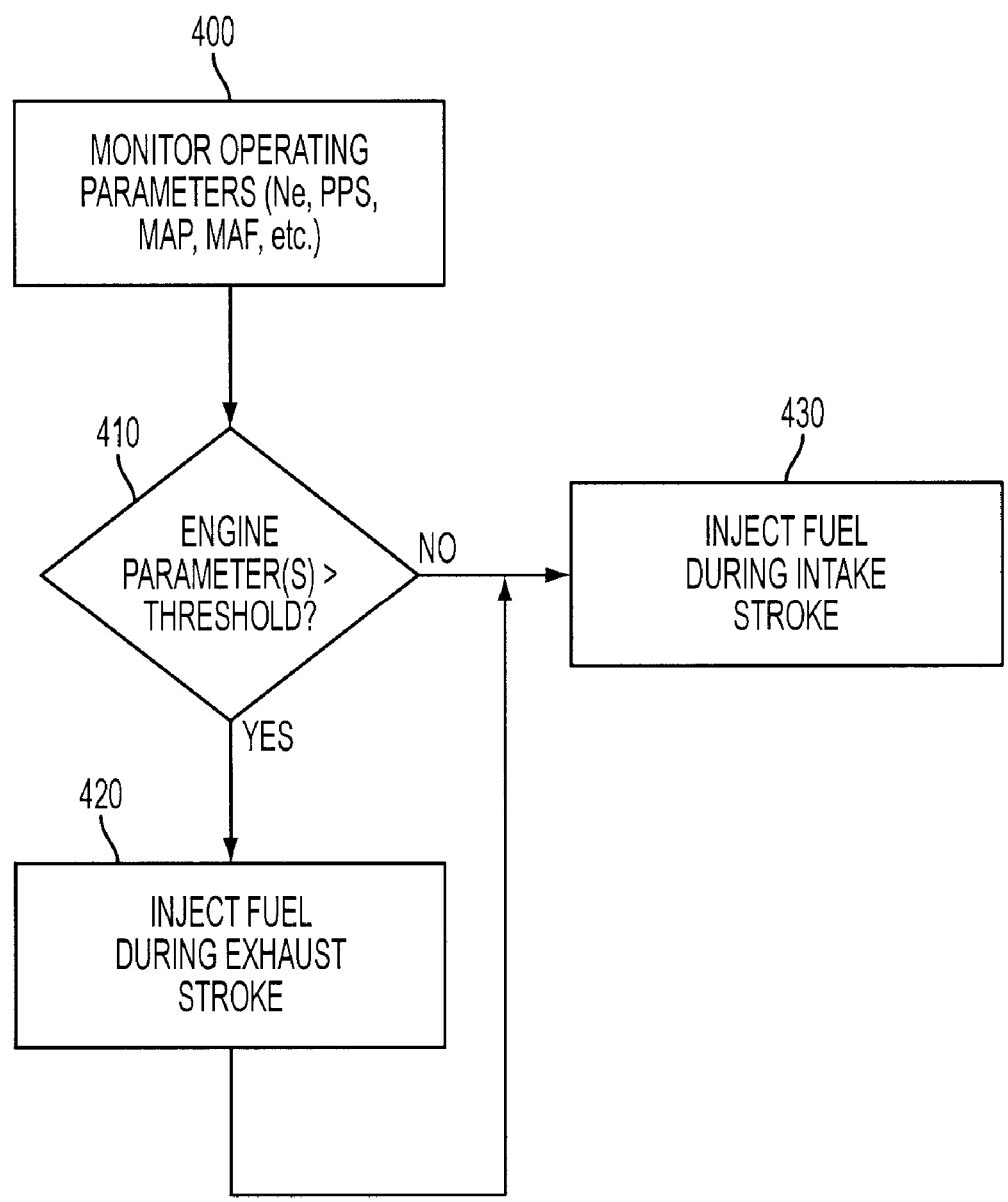

FIG. 8 is a graph comparing a single injection to a split injection using dynamometer measured engine-out (feedgas) hydrocarbon emissions as a function of the end of injection timing for the injection occurring during the intake stroke of one embodiment of the present disclosure; and FIG. 9 is a flow chart illustrating operation of a system or method for controlling a direct injection internal combustion engine according to one embodiment of the present disclosure.

DETAILED DESCRIPTION OF EMBODIMENT(S)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder, internal combustion engine with direct or in-cylinder injection. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22 has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like.

CPU 24 communicates with various sensors and actuators via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that are actuated under control by CPU 24, through I/O interface 32, are fuel injection timing, fuel injection rate, fuel injection duration, throttle valve position, spark plug ignition timing (in the event that engine 10 is a spark-ignition engine), and others. Sensors communicating input through I/O interface 32 may be indicating piston position, engine rotational speed, vehicle speed, coolant temperature, intake manifold pressure, accelerator pedal position, throttle valve position, air temperature, exhaust temperature, exhaust air to fuel ratio, exhaust component concentration, and air flow, for example. Some controller architectures do not contain an MMU 25. If no MMU 25 is employed, CPU 24 manages data and connects directly to ROM 26, RAM 28, and KAM 30. Of course, the present invention could utilize more than one CPU 24 to provide engine control and controller 22 may contain multiple ROM 26, RAM 28, and KAM 30 coupled to MMU 25 or CPU 24 depending upon the particular application.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled using a conventional camshaft arrangement, indicated generally by reference numeral 52. Camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless engine application) controls one or more exhaust valves 18 to exhaust the combusted air/fuel mixture through an exhaust manifold. A cylinder identification sensor 58 provides a signal (CID) once each revolution of the camshaft or equivalently once each combustion cycle from which the rotational position of the camshaft can be determined. In one embodiment, cylinder identification sensor 58 includes a sensor wheel 60 that rotates with camshaft 54 and includes a single protrusion or tooth whose rotation is detected by a Hall effect or variable reluctance sensor 62. Cylinder identification sensor 58 may be used to identify with certainty the position of a designated piston 64 within cylinder 12. The particular cylinder number and piston position may vary depending upon the particular application and implementation.

Additional rotational position information for controlling the engine is provided by a crankshaft position sensor 66 that includes a toothed wheel 68 and an associated sensor 70. In one embodiment, toothed wheel 68 includes thirty-five teeth equally spaced at ten-degree (10°) intervals with a single twenty-degree gap or space referred to as a missing tooth. In one embodiment for a four-cylinder engine, the missing tooth is positioned to identify ninety degrees (90°) before top center (BTC) of cylinder #1 and cylinder #4. In combination with cylinder identification sensor 58, the missing tooth of crankshaft position sensor 66 may be used to generate a signal (PIP) used by controller 22 for fuel injection and ignition timing as explained in greater detail herein. In one embodiment, a dedicated integrated circuit chip (EDIS) within controller 22 is used to condition/process the raw rotational position signal generated by position sensor 66 and outputs a signal (PIP) once per cylinder per combustion cycle, i.e. for a four-cylinder engine, four PIP signals per combustion cycle are generated for use by the control logic. Depending upon the particular application, control logic within CPU 24 may have additional position information provided by sensor 66 to generate a PIP signal or equivalent, for example. Crankshaft position sensor 66 may also be used to determine engine rotational speed and to identify cylinder combustion based on an absolute, relative, or differential engine rotation speed where desired.

An exhaust gas oxygen sensor 62 provides a signal (EGO) to controller 22 indicative of whether the exhaust gasses are lean or rich of stoichiometry. Depending upon the particular application, sensor 62 may provide a two-state signal corresponding to a rich or lean condition, or alternatively a signal that is proportional to the stoichiometry of the exhaust feedgas. This signal may be used to adjust the air/fuel ratio, or control the operating mode of one or more cylinders, for example. The exhaust gas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In one embodiment, the fuel delivery system includes only one fuel pump 110, which is a low-pressure fuel pump that provides pressurized fuel with a maximum pressure of less than about 35-40 bar (3.5-4.0 MPa) and typically between 30 bar-35 bar during normal operation. Fuel pressure may be controlled within a predetermined operating range of fuel pump 110 by a corresponding signal from controller 22. The injection strategy of the present disclosure was developed for use at high engine speeds/loads in low-pressure direct injection engines that rely solely on a low-pressure fuel pump such that an auxiliary or high-pressure pump (operating in the range of 150 bar) could be eliminated to reduce complexity and cost of the fuel system. However, the strategy is not necessarily limited to such applications and could be used in high-pressure fuel injection applications, although may not have the same advantages or result in the same degree of performance improvement.

Figure 1:
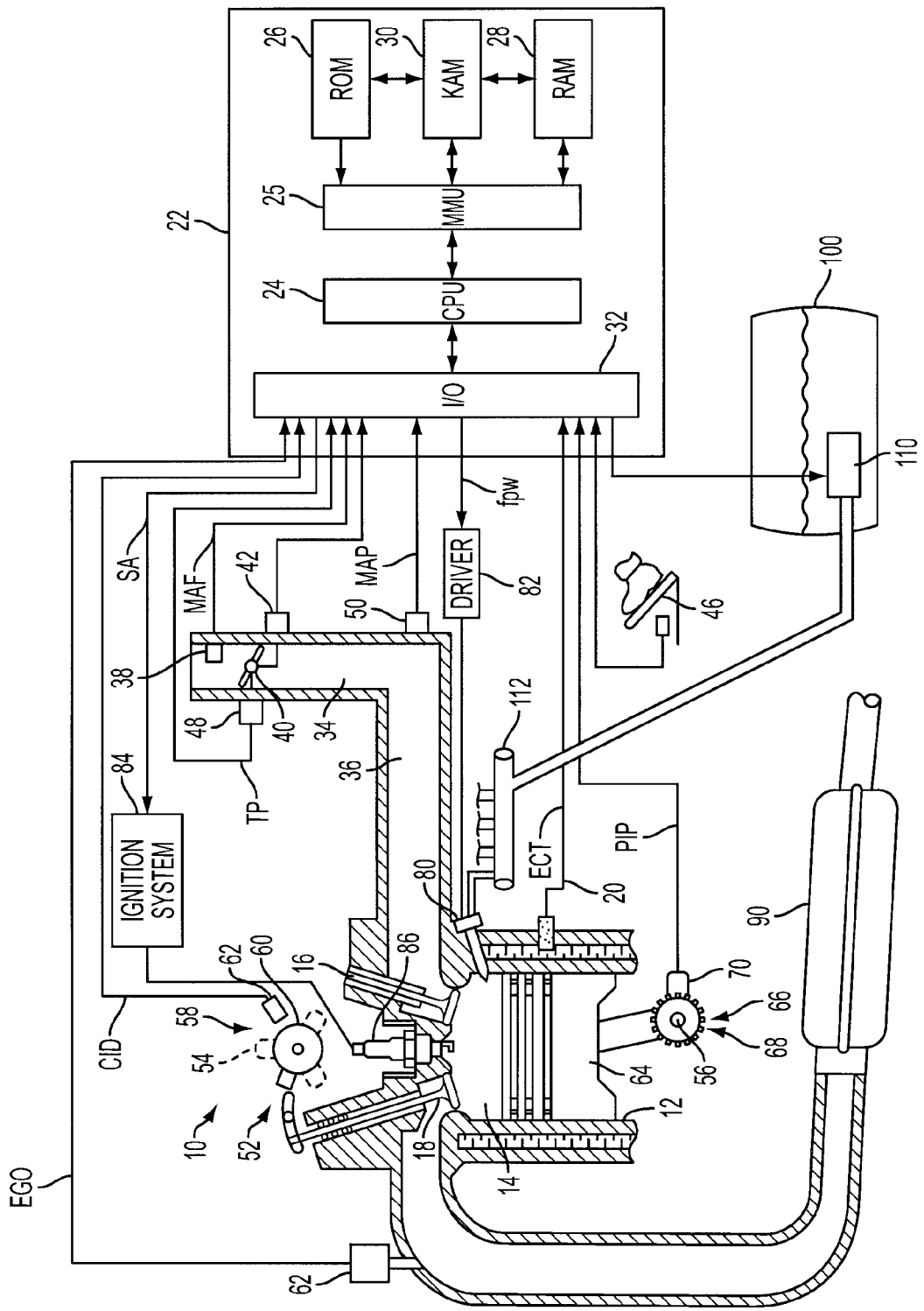
FIG. 1 is a block diagram of illustrating operation of a system or method for controlling a direct injection internal combustion engine according to one embodiment of the present disclosure.

In the representative embodiment illustrated in FIG. 1, fuel injector 80 is side-mounted on the intake side of combustion chamber 14, typically between intake valves 16. Fuel injector 80 injects a quantity of fuel directly into combustion chamber 14 in one or more injection events for a single engine cycle based on the current operating mode in response to a signal (fpw) generated by controller 22 and processed by driver 82. At the appropriate time during the combustion cycle, controller 22 generates a signal (SA) processed by ignition system 84 to control spark plug 86 and initiate combustion within chamber 14.

The present inventors have recognized that low-pressure direct injection applications often produce lower engine torque at high engine speeds relative to high-pressure systems. This is believed to be due to insufficient fuel-air mixing homogeneity. Lower fuel injection pressures may result in low penetration of the fuel spray droplets. Combined with strong intake airflow motion, the fuel spray is prevented from sufficient penetration through the airflow to the exhaust side of the combustion chamber. The injection strategy described herein improves high speed engine torque in low-pressure direct injection systems and may also provide benefits in high-pressure systems.

Controller 22 includes software and/or hardware implementing control logic to control the engine. In one embodiment, controller 22 controls injector 80 at high engine speed/load to inject fuel from fuel rail 112 directly into cylinder 14 in a first fuel injection during an exhaust stroke that mixes with air inducted through intake 36 and fuel from at least a second fuel injection starting during a subsequent intake stroke and/or compression stroke of the same engine cycle to form a mixture for combustion. Fuel is provided to common fuel rail 112 by pump 110, which may be a low-pressure pump that supplies pressurized fuel at a pressure of less than about 35-40 bar (3.5-4.0 MPa), for example. Engine speed may be determined based on the signal from crankshaft sensor 70 with high speed corresponding to a calibratable threshold related to maximum engine speed, such as at least 80% or 90% or corresponding values, for example. High load may be determined based on one or more signals from sensors including pedal position sensor 46, throttle position sensor 48, mass airflow sensor 38, and manifold pressure sensor 50, for example, with high load corresponding to a calibratable threshold related to full load, maximum torque, or wide open throttle, such as at least 80% or 90% or corresponding values, for example. The beginning, duration, and/or end of fuel injection events may be designated relative to crankshaft rotational position or degrees of crankshaft rotation. As used herein, start-of-injection (SOI) and end-of-injection events are generally referenced relative to degrees before top-dead-center (BTDC) of compression, i.e. relative to the number of degrees of crankshaft rotation before a piston reaches its uppermost position within the cylinder during the compression stroke of the combustion cycle. In terms of crankshaft or crank angle, zero/720 degrees corresponds to TDC at the beginning of the power stroke with 360 degrees corresponding to TDC at the end of the exhaust stroke and beginning of the intake stroke. Of course, the control strategy of this disclosure is not limited to any particular reference system or notation and other methods for designating or measuring the beginning, ending, and/or duration of injection events may also be used.

Figure 2:
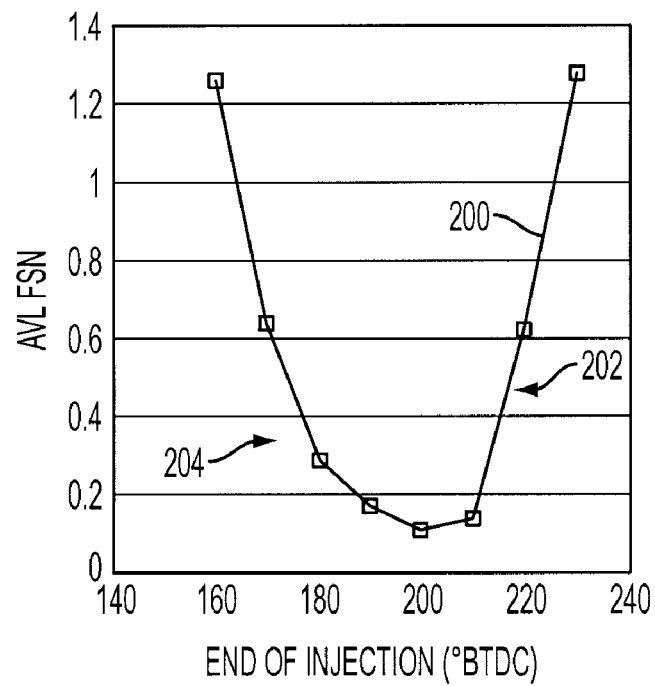
FIG. 2 is a graph illustrating the relationship between smoke emission and injection timing in a low-pressure direct injection engine at high speed/load according to one embodiment of the present disclosure.

During development of the fuel injection strategy of the present disclosure, it was recognized that mixture homogeneity can be improved by advancing fuel injection timing, which improves evaporation of fuel contacting the piston and increases time for the mixing process prior to ignition. However, the fuel injection timing is constrained by limits on smoke production. Line 200 in the graph of FIG. 2 illustrates dynamometer measured smoke emission as a function of injection timing for a low-pressure direct injection engine at 5000 rpm, wide-open throttle (WOT). This graph illustrates that smoke increases if injection timing is too early as indicated by reference numeral 202, which is believed to be caused by increased piston wetting. Similarly, smoke increases if fuel injection timing is too late as indicated by reference numeral 204, which is believed to be due to the lack of time for mixing. As such, embodiments of the present disclosure advance fuel injection timing with a portion of the total amount of fuel to attain a desired torque injected during the late exhaust stroke and the remaining fuel injected during the immediately following intake and/or compression stroke of the same engine cycle.

Figure 3:
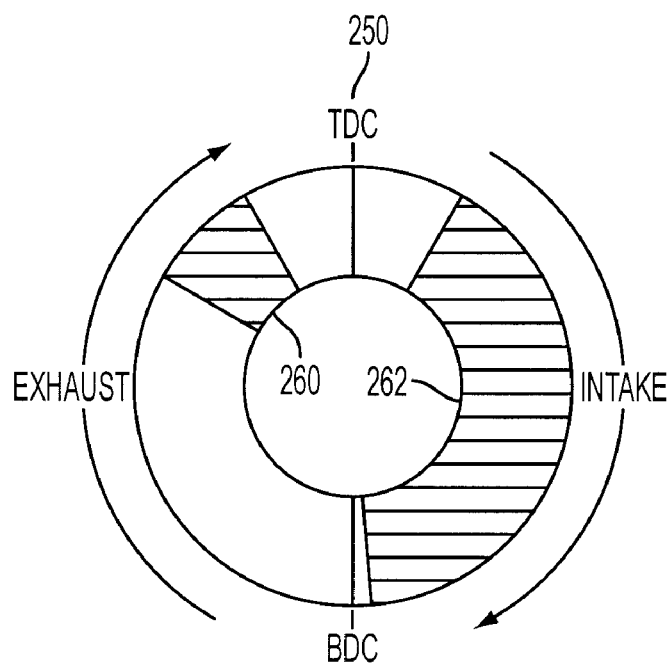
FIG. 3 is a diagram illustrating a split fuel injection strategy at high speed/load conditions with a first fuel injection during the exhaust stroke and a second fuel injection during the immediately following intake stroke according to one embodiment of the present disclosure.

FIG. 3 is a graphical representation of one embodiment of a fuel injection strategy according to the present disclosure. Reference numeral 250 represents top dead center (TDC) for the piston between the exhaust stroke and intake stroke. As shown in FIG. 3, a first fuel injection 260 begins and ends during the late exhaust stroke while the intake valves are still closed or only partially open where intake air flow momentum is not present or insignificant. This allows the fuel spray to penetrate the combustion chamber toward the exhaust side without being affected by the intake airflow. The low fuel penetration rate associated with the lower fuel injection pressure keeps substantially all of the fuel injected during the exhaust stroke within the combustion chamber for mixing with intake airflow and fuel injected during the subsequent fuel injection(s). This prevents any significant amount of fuel from escaping through the open exhaust valve(s), which could increase hydrocarbon emissions and/or adversely impact emissions treatment devices. A second fuel injection 262 begins during the immediately following intake stroke as the piston moves downward in the cylinder away from TDC and away from the fuel spray. Depending upon the particular application and implementation, the second fuel injection may extend into the compression stroke. Alternatively, the second fuel injection may end during the intake stroke as illustrated, with one or more additional fuel injections during the compression stroke, or the second injection may start and end during the compression stroke in some operating modes.

As illustrated in the embodiment of FIG. 3, the first injection is separated from the second injection to provide mixing and dispersion time for the first injection. Neither the end of the first fuel injection nor the beginning of the second fuel injection is performed immediately surrounding the TDC position of the piston to reduce piston wetting and the resulting smoke emissions. In this embodiment, the first injection starts at about 390 degrees BTDC of compression or, equivalently, at about 30 degrees before TDC of the intake, and has a duration of about 13 crank angle degrees. The second injection begins at about 300 degrees BTDC compression and has a duration of about 110 degrees. In another embodiment with an engine at 5000 rpm and wide-open throttle (WOT), the first injection begins at about 391 degrees BTDC compression and ends at TDC intake or, equivalently, 360 degrees BTDC compression. A second injection is separated by 36 crank angle degrees beginning at 324 degrees BTDC compression and ending at 200 degrees BTDC compression and resulting in a torque improvement of 1.5% relative to a single low-pressure injection.

Figure 4A:
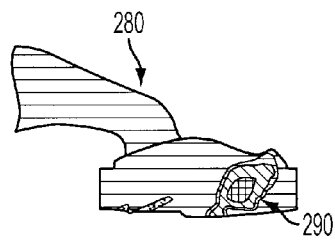
FIGS. 4A-4F are graphics illustrating computer simulated fuel vapor evolution during the late exhaust and early intake stroke for a fuel injection strategy according to one embodiment of the present disclosure.
Figure 4B:
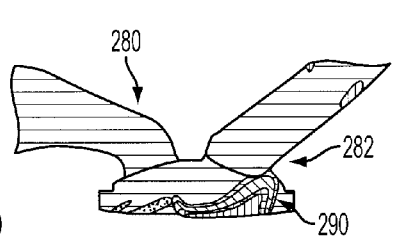
Figure 4C:
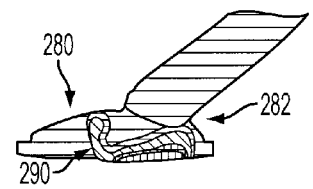
Figure 4D:
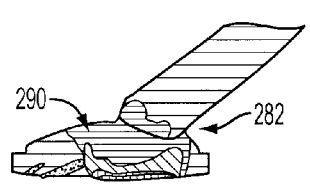
Figure 4E:
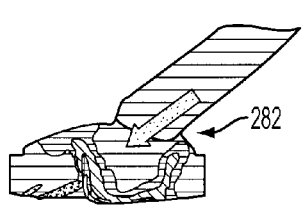
Figure 4F:
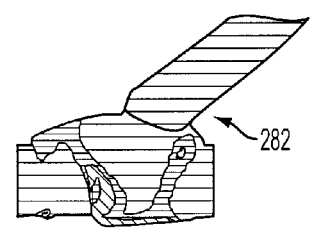

FIGS. 4A-4F are diagrams representing computer simulated operation of a fuel injection strategy for a low-pressure direct injection engine according to one embodiment of the present disclosure. The diagrams of FIG. 4 illustrate fuel vapor evolution at 20 degree crank angle increments along the central cross section of the cylinder around TDC between the exhaust and intake stroke. As shown in FIG. 4A representing a crank angle of 320 degrees during the late exhaust stroke, the exhaust port 280 is open and fuel 290 is injected from a side-mounted fuel injector mounted on the intake side of the cylinder. As shown in FIG. 4B representing a crank angle of 340 degrees, the fuel vapor and liquid fuel 290 penetrate into the cylinder toward the exhaust side as the intake port 282 begins to open and the exhaust port 280 begins to close. At this stage, the in-cylinder pressure is generally higher than the intake port pressure and the fuel vapor and liquid fuel 290 continue to travel toward the exhaust side of the cylinder. FIG. 4C, representing TDC or a crank angle of 360 degrees, the exhaust port 280 is closed and the intake airflow begins to deflect the fuel-vapor cloud 290. As the piston moves away from TDC at a crank angle of about 380 degrees, the fuel-vapor cloud 290 has moved to the exhaust port region as shown in FIG. 4D. The intake airflow continues to push the fuel vapor cloud 290 toward the exhaust side at crank angles of about 400 degrees and 420 degrees as shown in FIGS. 4E and 4F, respectively. Enriching the fuel-air mixture around the exhaust port improved the overall mixing homogeneity of the fuel-air mixture.

Figure 5:
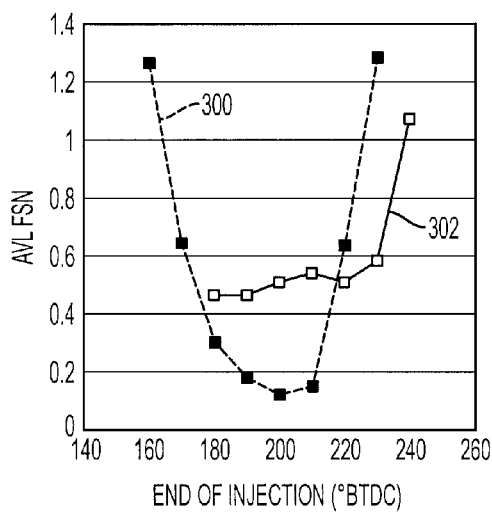
FIG. 5 is a graph comparing a single injection to a split injection using dynamometer measured smoke emission as a function of injection timing of the end of the injection occurring during the intake stroke of one embodiment of the present disclosure.

FIGS. 5-8 are graphs illustrating improved performance of a split fuel injection strategy for low-pressure direct injection spark ignition engines according to the present disclosure relative to a single fuel injection. The graphs illustrate dynamometer data collected at 5000 rpm WOT conditions. FIG. 5 is a graph illustrating the relationship between smoke and the end of fuel injection for the injection during the intake stroke. Line 300 represents the relationship for a single injection while line 302 represents the relationship for the second injection of a split injection with the first injection beginning during the late exhaust stroke. As shown by line 302, the end of injection for the split injection can be as early as 230 degrees BTDC with smoke level remaining less than 1.0. In contrast, the single injection represented by line 300 is constrained to 220 degrees to keep the smoke level less than 1.0.

Figure 6:
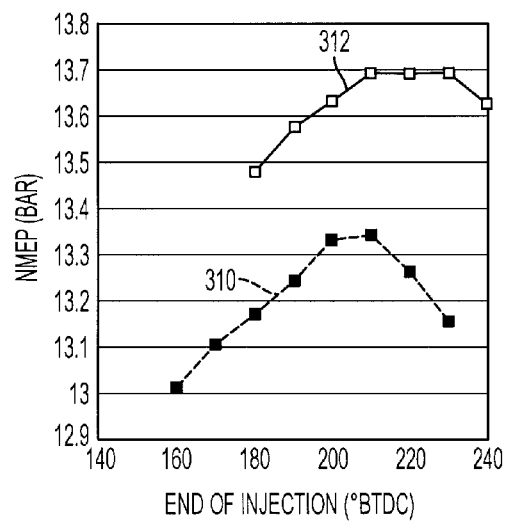
FIG. 6 is a graph comparing a single injection to a split injection using dynamometer measured NMEP as a function of the end of injection for the injection occurring during the intake stroke of one embodiment of the present disclosure.

FIG. 6 is a graph of the net maximum effective pressure (NMEP), which corresponds to the maximum torque produced, as a function of the end of injection timing for the injection occurring during the intake stroke, i.e. a single injection as represented by line 310 or the second of multiple injections represented by line 312. The plot of FIG. 6 shows that NMEP increased across the range of injection times with the maximum value increasing from about 13.35 for a single injection to about 13.7 for a split injection—an increase of about 2.5%.

Figure 7:
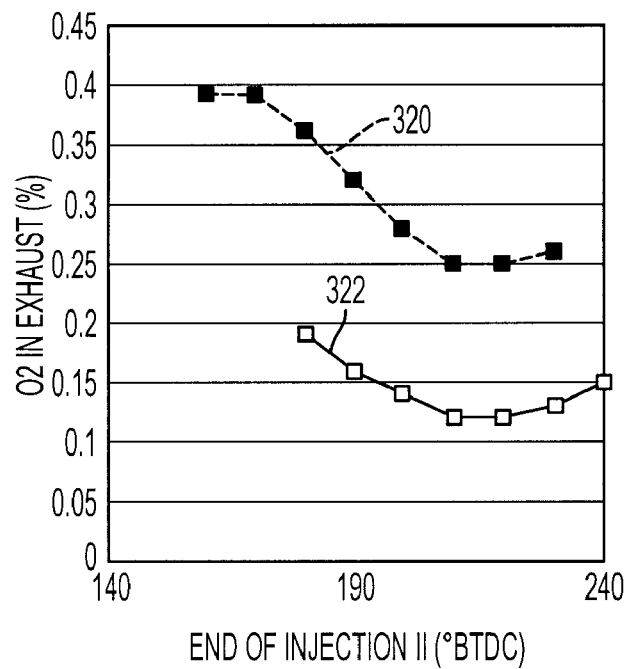
FIG. 7 is a graph comparing a single injection to a split injection using dynamometer measured engine-out (feedgas) oxygen as a function of the end of injection timing for the injection occurring during the intake stroke of one embodiment of the present disclosure.

FIGS. 7 and 8 demonstrate reduction in oxygen and hydrocarbon emissions, respectively, for a split injection strategy according to the present disclosure relative to a single injection. FIG. 7 is a graph of oxygen in exhaust as a function of injection timing for a single injection strategy represented by line 320 and the second injection of a split injection strategy represented by line 322. FIG. 8 is a graph of hydrocarbon emissions as a function of injection timing for a single injection strategy represented by line 330 and the second injection of a split injection strategy represented by line 332.

FIG. 9 is a flow chart illustrating operation of a system or method for operating a direct injection spark ignition engine according to one embodiment of the present disclosure. The specific control logic illustrated may represent one or more of any number of processing strategies such as event-driven, interrupt-driven, multi-tasking, multi-threading, and the like. As such, various steps or function illustrated may be performed in the sequence illustrated, in parallel, or in some cases omitted. Likewise, the order of processing is not necessarily required to achieve the features and advantages of the representative embodiments described herein, but is provided for ease of illustration and description. One or more of the illustrated steps may be repeatedly performed depending on the particular strategy being used whether or not explicitly illustrated or described.

Various engine operating parameters are monitored as indicated at block 400. Operating parameters that may be used in determining whether the engine is operating in a high speed and/or high load region include engine speed (Ne), manifold pressure (MAP), accelerator pedal position (PPS) or demanded torque, mass airflow (MAF), and the like. Block 410 represents a determination of whether the engine is operating in a region above a threshold based on one or more of the monitored operating parameters. Block 410 may be implemented by a single-dimensional or multi-dimensional look-up table, for example. In one embodiment, the threshold represented by block 410 corresponds to maximum engine speed and wide-open throttle. Other representative values may be 80% or 90% of maximum engine speed, torque, and/or load, for example.

When the engine is operating in a high speed and/or load region as determined by block 410, a split injection strategy is used with a first fuel injection occurring during the exhaust stroke as represented by block 420 and a second fuel injection occurring during the intake stroke as represented by block 430. If the engine is not operating in a high speed/load region, a single fuel injection may be used as represented by block 430. Of course, those of ordinary skill in the art will recognize that various engine and/or vehicle operating modes may also affect the selection of a particular fuel injection mode or strategy. As such, split injection may be used during these modes if desired. Conversely, a single injection may be indicated for some operating conditions that would otherwise trigger split injection using the illustrated logic.

As such, the present disclosure includes embodiments that provide increased torque at high engine speeds and loads using a single, low-pressure fuel pump by injecting a fraction of the total fuel injected per engine cycle during the exhaust stroke. Improved homogeneity of the fuel-air mixture at high engine speeds and loads results in reduced smoke and reduced feedgas emissions.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application. These attributes include, but are not limited to: cost, strength, durability, life cycle cost, marketability, appearance, packaging, size, serviceability, weight, manufacturability, ease of assembly, etc. The embodiments discussed herein that are described as less desirable to other embodiments with respect to one or more characteristics are not outside the scope of the disclosure.

What is claimed:

1. An engine comprising:
a fuel injector for each cylinder that injects fuel directly into the cylinder; and
a controller that generates control signals at least during high engine speed/load conditions to start and end a first fuel injection during an exhaust stroke that mixes with inducted air and fuel from at least a second fuel injection starting during at least one of an intake stroke and a compression stroke of the same cycle.

2. The engine of claim 1 wherein the first and subsequent fuel injections have a fuel pressure of less than about 40 bar.

3. The engine of claim 1 further comprising a fuel delivery system coupled to the fuel injectors, the fuel delivery system including only one fuel pump, with the fuel pump having a maximum fuel pressure of less than about 40 bar.

4. The engine of claim 1 wherein each fuel injector is side-mounted in a corresponding cylinder.

5. The engine of claim 4 wherein each fuel injector is on an intake side of the cylinder.

6. The engine of claim 1 wherein high engine speed/load conditions correspond to an engine speed of at least 90% of a maximum rated engine speed and high load corresponds to at least 90% of full load at current barometric pressure.

7. The engine of claim 1 wherein the high engine speed/load conditions correspond to an engine speed of at least 80% of a maximum rated engine speed and wide open throttle.

8. The engine of claim 1 wherein the first injection ends before a piston in the cylinder reaches TDC position.

9. The engine of claim 1 wherein the start of the second fuel injection occurs at least twenty crank angle degrees after the end of the first fuel injection.

10. The engine of claim 1 wherein the second fuel injection ends no later than when a piston in the cylinder reaches 40 crank angle degrees after BDC position.

11. The engine of claim 1 further comprising a spark plug mounted in each cylinder and in communication with the controller, the spark plug igniting the combustion mixture in response to a corresponding signal from the controller.

12. A method for operating a four-stroke multiple cylinder internal combustion engine, the method comprising:
injecting fuel directly into the cylinder in at least a first fuel injection beginning during an exhaust stroke and a second injection beginning during an intake stroke when demanded torque exceeds a threshold value; and
injecting fuel directly into the cylinder in a single fuel injection otherwise.

13. The method of claim 12 wherein the first fuel injection ends during the exhaust stroke.

14. The method of claim 12 wherein the threshold value corresponds to at least 90% of maximum rated torque.

15. The method of claim 12 wherein the threshold value corresponds to average torque produced under current operating conditions for a fuel injection spanning an entire intake stroke.

16. The method of claim 12 further comprising igniting a fuel air mixture formed from the first and second injections within the cylinder using an ignition source disposed within the cylinder.

17. The method of claim 12 further comprising supplying fuel to the fuel injectors at a pressure of less than about 40 bar.

18. A computer readable storage medium having data stored therein representing at least instructions executable by a microprocessor to control an internal combustion engine, the computer readable storage medium comprising:
instructions for determining current engine operating speed and load; and
instructions for injecting fuel directly into a combustion chamber of the engine in at least a first fuel injection beginning in an exhaust stroke and a second injection beginning after the exhaust stroke when the engine is operating at high speed and high load.

19. The computer readable storage medium of claim 18 wherein the instructions for injecting fuel include instructions for injecting fuel in a first injection beginning and ending during the exhaust stroke when operating the engine at wide open throttle.

20. The computer readable storage medium of claim 18 wherein the instructions for injecting fuel include instructions for injecting fuel in a second fuel injection wherein the beginning of the second fuel injection is separated from the end of the first fuel injection by at least ten crank angle degrees.

* * * * *